No. 654,104. Patented July 17, 1900.
K. O. F. SCHROTTKE.
MEASURING INSTRUMENT.
(Application filed Sept. 2, 1899.)
(No Model.)
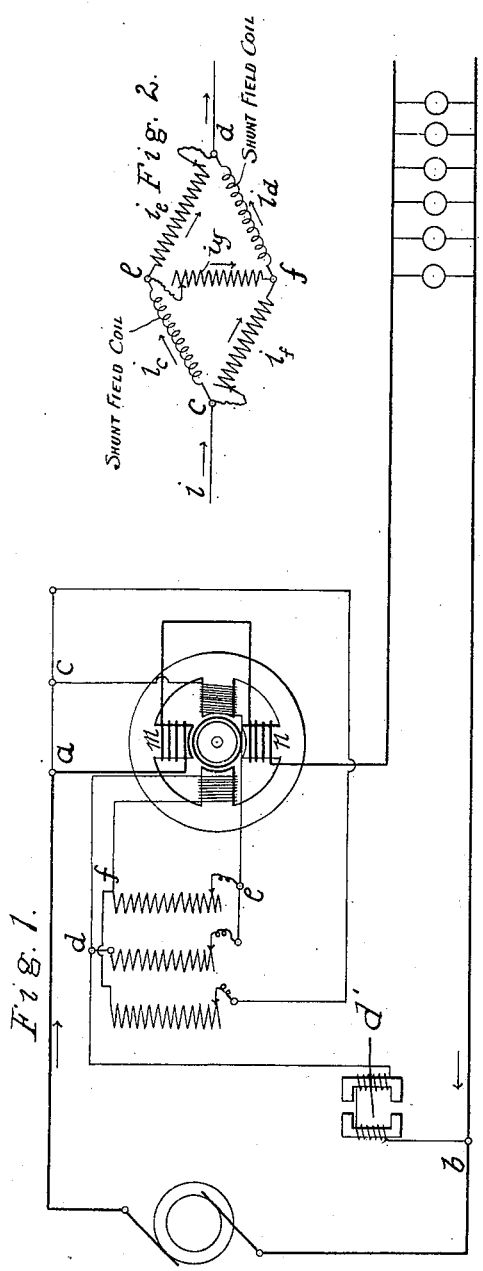
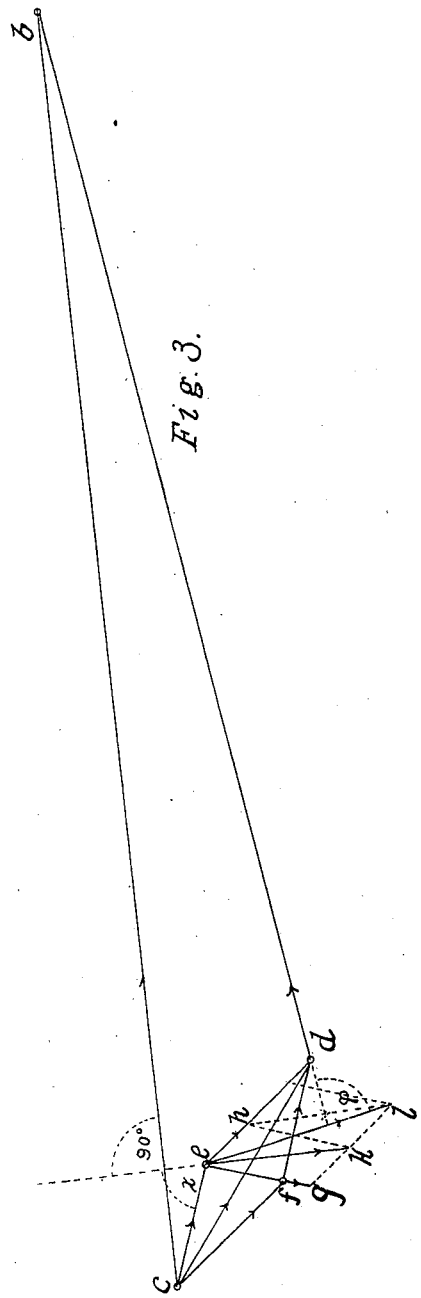
Inventor:
Karl Otto Franz Schrottke,
By Charles A. Brown + Cragg
Attorneys.

UNITED STATES PATENT OFFICE.

KARL OTTO FRANZ SCHROTTKE, OF BERLIN, GERMANY, ASSIGNOR TO THE SIEMENS & HALSKE ELECTRIC COMPANY OF AMERICA, OF CHICAGO, ILLINOIS.

MEASURING INSTRUMENT.

SPECIFICATION forming part of Letters Patent No. 654,104, dated July 17, 1900.

Application filed September 2, 1899. Serial No. 729,325. (No model.)

*To all whom it may concern:*

Be it known that I, KARL OTTO FRANZ SCHROTTKE, a subject of the Emperor of Germany, residing at Berlin, Germany, have invented a certain new and useful Improvement in Measuring Instruments, (Case No. 222,) of which the following is a full, clear, concise, and exact description, reference being had to the accompanying drawings, forming a part of this specification.

My invention relates to measuring instruments operating through the agency of rotating or shifting fields, and has for its object the provision of improved means for adjusting the relative phase of the current in the shunt-field coils of such instruments. It is essential that a phase difference of ninety degrees exist between the pressure and the field created by the current in the pressure-coils in instruments of this class in order that the readings may correspond accurately with the working current. If the phase displacement be not ninety degrees, the indications of the instrument will be in error, the magnitude of the error depending upon the amount of displacement of the phase of the shunt-field from the correct displacement of ninety degrees. It is therefore necessary to provide means for accurately adjusting the relative phase of the shunt-field. A number of ways have been suggested for accomplishing this result, all of which necessitated very careful attention, no ready and easy means of adjustment being provided for. It is necessary to effect two adjustments in instruments of this class—the first for making the indications of the measuring instrument directly proportional in a fixed ratio to the working current traversing the circuit and the second for effecting a phase difference of ninety degrees between the impressed pressure and the current in the shunt-windings. The first adjustment is readily made by changing the value of the current in either the pressure or the current coils. The second adjustment is made after the first adjustment is effected. In securing the second adjustment by the means heretofore devised the first adjustment was disturbed. With the devices at present employed it is therefore usually necessary to make each adjustment several times, and it is possible only after a number of careful efforts to place the instrument in working order. By the present invention I supply means whereby the second adjustment may be made without materially disturbing the first.

The principles underlying my invention and the manner of arranging the circuits will be explained by reference to the accompanying drawings, illustrating the preferred embodiment of the invention, in which—

Figure 1 is a diagrammatic view of a measuring instrument, with its connections, associated with devices necessary to secure correct adjustment. Fig. 2 represents diagrammatically the arrangement of the adjusting-circuit and the shunt-field coils. Fig. 3 is a diagram mathematically illustrating the electrical problems involved.

Like letters indicate like parts in all the views.

The shunt-conductor is shown connected between the mains of the system at the points $a\ b$. The shunt-winding is divided into coils connected between the points $c\ e$ and $f\ d$. Adjusting and adjustable resistances are included between the points $c\ f$ and the points $e\ d$ and the points $e\ f$. To prevent waste of current, a supplemental inductive resistance $d'$ is included in the bridge or shunt conductor uniting the points $a\ b$. The field-winding is thus divided into two coils placed upon opposite sides of a Wheatstone bridge, the remaining opposite sides of the bridge being adjusting means or coils, and an adjusting means or coil also constitutes a diagonal of the bridge. In other words, the current flows through the coils of the shunt-field winding in parallel paths, an adjusting resistance being included in each path, while a third adjusting resistance or means unites the inner terminals of the field-coils and the aforesaid adjusting resistances—that is, those terminals that are not directly connected with the shunt-conductor. By making each of these adjusting-resistances adjustable the desired phase regulation may readily and accurately be secured. I use the term "adjusting resistance" herein, meaning such instrumentalities as will accomplish the result desired. By adjusting the said non-inductive resistances $cf\,de$ I am enabled to secure an operation of the meter proportional to the working current traversing the circuit, inasmuch as these resistances carry only that part of the current which is not utilized in creating the pressure-field. For securing the necessary phase adjustment the diagonal non-inductive resistance $ef$ is employed.

In explaining the operation of the apparatus I will designate the current values in the separate parts of the circuit by the letter $i$, with subscripts to indicate currents in the different branches of the Wheatstone-bridge circuit, $i$ representing the total current in the shunt $ab$. The total current $i$ in the bridge-conductor by my invention may be made by adjustment equal to twice the current in the non-inductive resistance $ed$ plus the current in the diagonal non-inductive resistance $ef$, or, stated mathematically, $i = 2i_e + i_g$. Assuming the direction of the currents to be as indicated by the arrows, it will be seen that the current in the shunt-field coil $ec$ is equal to the sum of the currents in the side and diagonal non-inductive resistances $ef, ed$. Likewise the current in the shunt-field coil $fd$ is equal to the sum of the currents in the side and diagonal non-inductive resistances $ef, fc$. It is obvious also that the total current $i$ is equal to the sum of the currents in its two branches $ce$ and $cf$ or in its other two branches $ed$ and $df$, which may be expressed by the equation, $i = i_d + i_e$. As the current of one field-coil $fd$ represents the sum of the currents in the two non-inductive resistances $cf$ and $ef$, we may substitute for it these quantities and obtain as a result that the total current $i$ is equal to the sum of the currents in the three non-inductive resistances. As the two field-coils should be alike, it is necessary to make the non-inductive resistances $ed$ and $cf$ equal to make the currents in the field-coils equal, so that the currents $i_e$ $i_f$ in the side resistances should be equal. As the total current $i$ is equal to the sum of the currents in the three non-inductive resistances and as two of these are equal, it follows that the total current $i$ represents the sum of the current in one non-inductive resistance $cf$ and twice the current in either of the other two $ef$ and $ed$. A demonstration may more clearly be made by reference to the mathematical diagram, Fig. 3. The total pressure across the shunt-circuit $bc$ may be resolved into two components—the pressure $cd$ across the Wheatstone-bridge circuit and the pressure $db$ across the inductive resistance $d'$. The Wheatstone-bridge circuit being in series with the inductive resistance $d'$, the total current $i$ of the Wheatstone-bridge circuit must also pass through the inductive resistance $d'$. The phase of the current $i$ must be the same in all parts of the circuit; but as the phase relation between the current and its electromotive force depends upon the inductive conditions of the respective circuits it is obvious that the phase of the pressure across the circuit $cd$ may be displaced from the phase of the pressure across the circuit $db$. These phase relations may be anything desired, and if a certain ratio of resistance to inductance be assumed for the circuit $cd$ a certain ratio of resistance to inductance of the circuit $db$ will give the phase relations of the pressures shown in Fig. 3 irrespective of the absolute values of the impedance. The value of the impedance, however, influences the magnitude of the current. The pressure $cd$ across the Wheatstone-bridge circuit is again divided into components, consisting of the pressures $ce$ and $ed$ across one field-coil and one side non-inductive resistance and the pressures $fd$ and $cf$ across one field-coil and one side non-inductive resistance. The phase triangle of the three pressures $cf$, $ef$, and $ce$ across one side non-inductive resistance, the diagonal non-inductive resistance, and one field-coil must close, as they form a closed circuit, the path $cd$ not representing a metallic circuit, but simply a resultant of the four pressures in the circuit, and hence the pressure across the diagonal non-inductive resistance may be represented in magnitude and direction by a line $ef$, joining the terminals of the other two pressures $ce$ and $cf$. These pressure relations depend upon values of the resistances $cf$ and $ef$ and the impedance $ce$, and may be anything desired, $cf$, $ef$, and $ce$ representing the values of the electromotive forces $i_f R_1$, $i_g R_2$, and $i_e P$ where $R_1$, $R_2$, and P represent, respectively, the resistances of the circuit $cf$, the circuit $ef$, and the impedance of the circuit $ce$. The current $i_g$ of the diagonal non-inductive resistance being in phase with its pressure, must, therefore, be represented by the same line $eg$. The current $i_e$ in the side non-inductive resistance $ed$ is also in phase with its pressure and may be likewise represented by the line $eh$. By geometrically adding these two currents—that is, by completing the parallelogram $gehk$ and constructing the diagonal $ek$—I obtain the current in the shunt-coil $ce$, which, as before explained, is the geometrical sum of the two currents. This current is shown in the figure to be displaced ninety degrees from the impressed pressure. This is the desired displacement, and to show that it may be in reality obtained I geometrically combine the current $eg$ in the diagonal non-inductive resistance with twice the current $eh$ in one side non-inductive resistance, and thus obtain the total current as the diagonal $el$ of the parallelogram, these combinations being based upon a foregoing equation, $i = 2i_e\, i_g$. This total current $i$ lags behind the pressure of the inductive resistance by the angle $\varphi$, which is less than ninety degrees, showing that no abnormal phase relations exist in the coil $d'$. The current in the shunt-coils lags behind its pressure by an angle $x$, as is apparent from the figure. A further specific and algebraic discussion will be both difficult and unsatisfactory, and I therefore simply give the result I have obtained by careful approximation and experiment to illustrate in how simplified a manner the apparatus may be adjusted. I find that the phase displacement between the shunt-field current $e\ k$ and the impressed pressure $b\ c$ is susceptible of a variation between eighty and one hundred degrees by means of the diagonal non-inductive resistance $e\ f$ without greatly changing the value of the shunt-current $e\ k$, it being assumed that the impressed pressure $b\ c$ is constant. In practice the necessary change of adjustment is limited, and I am therefore enabled to effect the same without materially changing the current in the shunt-winding.

Having thus described an embodiment of my invention, I claim as new, and desire to secure by Letters Patent, the following:

1. In an alternating-current motor, the combination with a field-winding therefor, of a Wheatstone-bridge circuit for adjusting the phase of the magnetism due to said field-winding, said winding constituting a lateral portion of the Wheatstone bridge, substantially as described.

2. The combination with the conductors of an alternating-current circuit, of a motor having field-windings, one of the field-windings being adapted for inclusion in bridge of said conductors, and a Wheatstone-bridge circuit also included in the said bridge, the latter field-winding forming a lateral portion of the Wheatstone-bridge circuit, substantially as described.

3. The combination with a source of alternating current in circuit with translating devices, of a motor having series and shunt windings supplied with current from said source of alternating current, and a Wheatstone-bridge circuit, two of whose sides are made of the shunt-field winding of the said motor, the remaining sides being made up of adjusting resistances, an adjusting resistance being included in the diagonal conductor of the Wheatstone-bridge circuit, substantially as described.

4. The combination with the supply-conductors of an alternating-current circuit, of a motor measuring instrument having field-windings for receiving current therefrom to create fields proportional to the current and pressure, and a Wheatstone-bridge circuit included in circuit with the pressure-field for adjusting the phase of the magnetism due thereto, the pressure-field winding forming a lateral portion of the Wheatstone bridge, substantially as described.

5. In an alternating-current-measuring instrument, the combination with a series winding, of a shunt-winding divided into two coils, the outer terminals of the coils being connected with main terminals adapted for connection with the mains of the system, adjusting resistances having terminals connected with the remaining or inner terminals of the shunt-coils, the remaining terminals of the adjusting resistances having connection with the aforesaid main terminals, and an additional adjusting resistance connecting the inner terminals of the shunt-coils and the aforesaid adjusting resistances, substantially as described.

6. The combination with the supply-conductor of an alternating-current circuit, of a motor measuring instrument having field-windings for receiving current therefrom to create fields proportional to the current and pressure, a Wheatstone-bridge circuit included in circuit with the pressure-field for adjusting the phase of the magnetism due thereto, the pressure-field winding forming a lateral portion of the Wheatstone bridge, and inductance $d'$ included in circuit with the pressure-field winding to reduce the current flowing therethrough, substantially as described.

7. The combination with a source of alternating current, of a measuring instrument having current and pressure field windings adapted to receive current therefrom, a Wheatstone-bridge circuit included in circuit with the pressure-winding, the latter winding being subdivided and included in opposite sides of the Wheatstone bridge, the remaining two sides of the Wheatstone bridge and the diagonal thereof including adjusting resistances, substantially as described.

8. The combination with a source of alternating current, of a measuring instrument having current and pressure field windings adapted to receive current therefrom, a Wheatstone-bridge circuit included in circuit with the pressure-winding, the latter winding being subdivided and included in opposite sides of the Wheatstone bridge, the remaining two sides of the Wheatstone bridge and the diagonal thereof including adjusting resistances, and inductance included in circuit with the pressure-winding to reduce the current flowing therethrough, substantially as described.

9. In an alternating-current-measuring instrument, the combination with a series winding, of a shunt-winding divided into two coils, the outer terminals of the coils being connected with main terminals adapted for connection with the mains of the system, adjusting resistances having terminals connected with the remaining or inner terminals of the shunt-coils, the remaining terminals of the adjusting resistances having connection with the aforesaid main terminals, an additional adjusting resistance connecting the inner terminals of the shunt-coils and the aforesaid adjusting resistances, and inductance included in circuit with the shunt-winding to reduce the flow of current therethrough, substantially as described.

10. In an alternating-current motor, the combination with a winding therefor, of a Wheatstone-bridge circuit for adjusting the phase of the magnetism, said winding constituting a lateral portion of the Wheatstone bridge, substantially as described.

In witness whereof I hereunto subscribe my name this 15th day of August, A. D. 1899.

KARL OTTO FRANZ SCHROTTKE.

Witnesses:
HENRY HASPER,
WILLIAM MAYNER.